US012586424B2

(12) United States Patent
Kushibiki

(10) Patent No.: US 12,586,424 B2
(45) Date of Patent: Mar. 24, 2026

(54) DRIVING DIAGNOSIS DEVICE

(71) Applicant: TOYOTA JIDOSHA KABUSHIKI KAISHA, Toyota (JP)

(72) Inventor: Yukiya Kushibiki, Gifu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 93 days.

(21) Appl. No.: 18/423,570

(22) Filed: Jan. 26, 2024

(65) Prior Publication Data

US 2024/0338979 A1 Oct. 10, 2024

(30) Foreign Application Priority Data

Apr. 10, 2023 (JP) ................................ 2023-063770

(51) Int. Cl.
*G07C 5/02* (2006.01)
*G07C 5/00* (2006.01)

(52) U.S. Cl.
CPC ............... *G07C 5/02* (2013.01); *G07C 5/008* (2013.01)

(58) Field of Classification Search
CPC ..... G07C 5/02; G07C 5/008; B60W 2520/10; B60W 2520/105; B60W 2540/10; B60W 2540/20; B60W 2540/223; B60W 40/09; B60W 50/14
USPC ........................................................ 701/29.4
See application file for complete search history.

(56) References Cited

U.S. PATENT DOCUMENTS

| | | | | |
|---|---|---|---|---|
| 6,927,694 | B1 * | 8/2005 | Smith | B60K 28/066 340/576 |
| 2011/0037595 | A1 * | 2/2011 | Kapuria | B60K 28/066 382/103 |
| 2019/0213429 | A1 * | 7/2019 | Sicconi | G06F 3/012 |
| 2020/0057487 | A1 * | 2/2020 | Sicconi | G06F 3/011 |
| 2020/0290630 | A1 * | 9/2020 | Elwart | B60W 40/08 |
| 2021/0005224 | A1 * | 1/2021 | Rothschild | H04N 9/8205 |
| 2025/0091575 | A1 * | 3/2025 | Larsson | B60W 30/0956 |

FOREIGN PATENT DOCUMENTS

JP 2022-067889 A 5/2022

* cited by examiner

*Primary Examiner* — Tyler D Paige
(74) *Attorney, Agent, or Firm* — SoraIP, Inc.

(57) ABSTRACT

The control unit extracts a temporary stop scene from image information and vehicle information for a predetermined diagnosis time longer than the first time every predetermined first time, and performs a driving diagnosis for safety confirmation.

6 Claims, 2 Drawing Sheets

DRIVING DIAGNOSIS DEVICE

CROSS-REFERENCE TO RELATED APPLICATION

This application claims priority to Japanese Patent Application No. 2023-063770 filed on Apr. 10, 2023, incorporated herein by reference in its entirety.

BACKGROUND

1. Technical Field

The present disclosure relates to a driving diagnosis device.

2. Description of Related Art

Japanese Unexamined Patent Application Publication No. 2022-067889 (JP 2022-067889 A) proposes a driving evaluation system that determines, in an on-board device, whether a safe driving behavior is performed regarding specific driving behaviors such as a temporary stop and a safety check, and gives a caution such as a warning to a driver in real time.

SUMMARY

The technology of JP 2022-067889 A describes that the caution is given in real time, but it is necessary to download stop intersection information. There is room for improvement in terms of driving diagnosis of a safety check on a temporary stop scene with improvement in terms of the real-time feature.

The present disclosure has been made in consideration of the above facts, and an object of the present disclosure is to provide a driving diagnosis device that can perform driving diagnosis of a safety check on a temporary stop scene with improvement in terms of a real-time feature.

A driving diagnosis device according to a first aspect includes: an acquisition unit configured to acquire a result of detection of vehicle information and a captured image of a driver; and a diagnosis unit configured to, at intervals of a predetermined first period, extract a temporary stop scene from an acquisition result of the acquisition unit for a predetermined diagnosis period longer than the first period, and perform driving diagnosis on a safety check.

According to the first aspect, the driving diagnosis is performed by extracting, at intervals of the predetermined first period, the temporary stop scene from the acquisition result of the acquisition unit for the predetermined diagnosis period longer than the first period. Therefore, it is possible to perform the driving diagnosis of the safety check on the temporary stop scene with improvement in terms of the real-time feature.

In the driving diagnosis device according to a second aspect, in the driving diagnosis device according to the first aspect, the diagnosis unit may be configured to, within the diagnosis period, perform the driving diagnosis for a period from a time when the vehicle information satisfies a predetermined start condition to a time when the vehicle information satisfies a predetermined end condition.

According to the second aspect, the driving diagnosis is performed from the start condition to the end condition. Therefore, it is possible to perform the driving diagnosis after the detection of the temporary stop scene.

In the driving diagnosis device according to a third aspect, in the driving diagnosis device according to the first aspect or the second aspect, the diagnosis unit may be configured to calculate a predetermined important performance evaluation index for performing the driving diagnosis on the safety check on the temporary stop scene from the acquisition result of the acquisition unit, and perform the driving diagnosis by using the calculated important performance evaluation index.

According to the third aspect, it is possible to perform the driving diagnosis on the driving scene of temporary stop by calculating the important performance evaluation index.

In the driving diagnosis device according to a fourth aspect, in the driving diagnosis device according to the third aspect, the diagnosis unit may be configured to calculate, as the important performance evaluation index, a direction of a direction indication signal at a start of the safety check, maximum and minimum head turning angles of the driver in a section from the start of the safety check to a time before an elapse of a predetermined second period, a duration during which the head turning angle in the section from the start of the safety check to the time before the elapse of the second period is larger than a predetermined angle, and a duration during which the head turning angle in the section from the start of the safety check to the time before the elapse of the second period is within a predetermined angle range.

According to the fourth aspect, the driving scene of temporary stop can be identified by calculating these important performance evaluation indices.

The driving diagnosis device according to a fifth aspect may further include, in the driving diagnosis device according to one of the first aspect to the fourth aspect, a notification unit configured to give notifications about diagnosis results of the diagnosis unit, and give a notification about the diagnosis result obtained first with priority in a case where the diagnosis results overlap each other.

According to the fifth aspect, the notification about the overlapping diagnosis results is given such that the notification is given with priority about the diagnosis result obtained first. Therefore, it is possible to give the notification about the driving diagnosis result while excluding the overlapping diagnosis results.

As described above, according to the present disclosure, it is possible to provide the driving diagnosis device that can perform the driving diagnosis of the safety check on the temporary stop scene with improvement in terms of the real-time feature.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
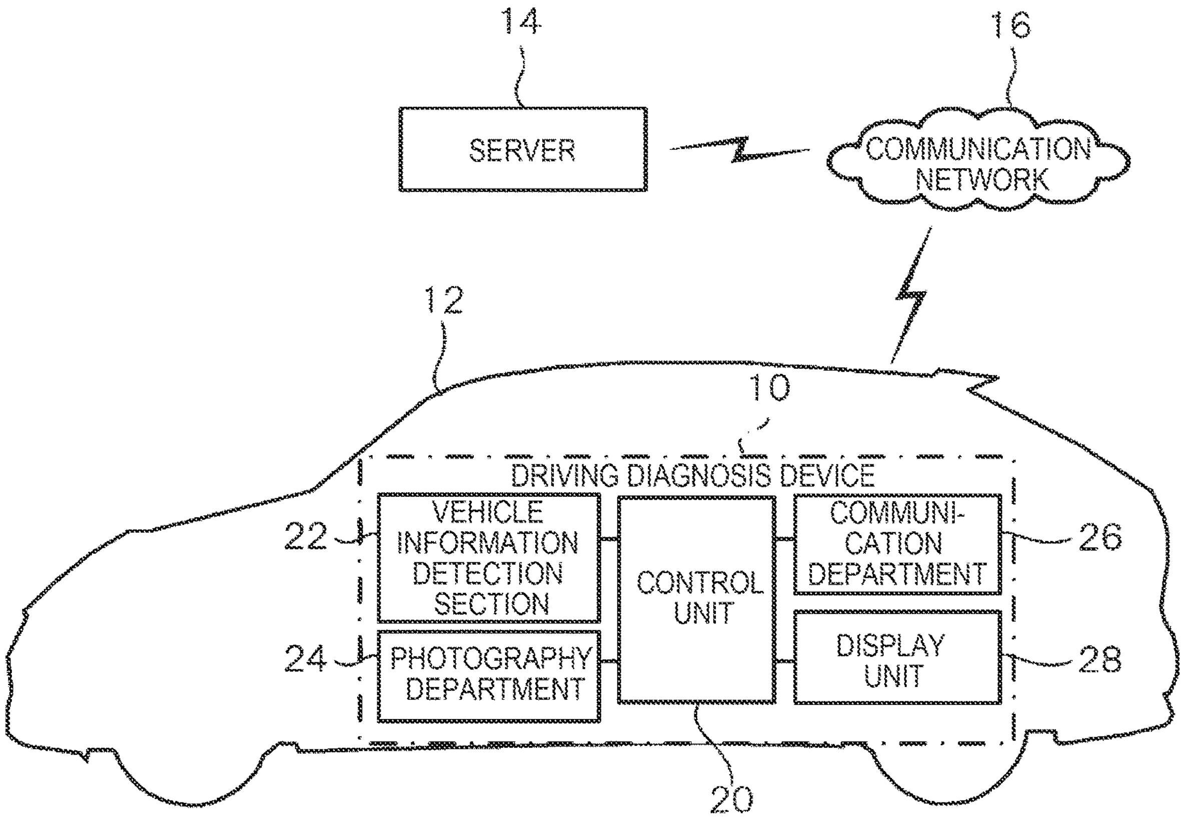
FIG. 1 is a diagram showing a schematic configuration of a driving diagnosis device according to the present embodiment.

Hereinafter, an example of an embodiment of the present disclosure will be described in detail with reference to the drawings. FIG. 1 is a diagram showing a schematic configuration of a driving diagnosis device according to this embodiment.

The driving diagnosis device 10 according to the present embodiment is mounted on a vehicle 12 and performs a driving diagnosis of a driver who drives the vehicle 12. In the present embodiment, an example will be described in which driving diagnosis is performed to check safety in a temporary stop scene, but driving diagnosis may be performed to check other safety such as lane changes, right/left turns, and backing up.

The driving diagnosis device 10 is connectable to a server 14 such as a cloud server via a communication network 16. The diagnosis results of the driving diagnosis device 10 may be transmitted to the server 14, and the server 14 may manage the driving diagnosis results of each vehicle.

The driving diagnosis device 10 includes a control unit 20 as an example of an acquisition unit and a diagnosis unit, a vehicle information detection unit 22, a photographing unit 24, a communication unit 26, and a display unit 28 as an example of a notification unit.

The vehicle information detection unit 22 detects vehicle information regarding the vehicle 12. In this embodiment, vehicle speed information representing vehicle speed, accelerator operation amount, direction indicating signal, and position information of the vehicle 12 are acquired as examples of vehicle information, but other vehicle information may also be detected. For example, vehicle information such as acceleration, distance to obstacles around the vehicle, route, etc. is detected. Specifically, the vehicle information detection unit 22 can apply a plurality of types of sensors and devices that acquire information representing the state of the surrounding environment of the vehicle 12. Examples of sensors and devices include sensors mounted on the vehicle 12 such as a vehicle speed sensor, a steering angle sensor, and an acceleration sensor, a Global Navigation Satellite System (GNSS) device, an on-vehicle communication device, a navigation system, and a radar device. Can be mentioned. The GNSS device receives GNSS signals including time information from a plurality of GNSS satellites and measures the position of the own vehicle 12. As the number of GNSS signals that can be received by a GNSS device increases, the accuracy of positioning improves. The in-vehicle communication device is a communication device that performs at least one of vehicle-to-vehicle communication with another vehicle 12 and road-to-vehicle communication with a roadside device via the communication unit 26. The navigation system includes a map information storage unit that stores map information, and displays the position of the own vehicle 12 on a map based on the position information obtained from the GNSS device and the map information stored in the map information storage unit. or guide the route to the destination. The radar device includes a plurality of radars with different detection ranges, and detects objects such as pedestrians and other vehicles 12 existing around the own vehicle 12, and determines the relative position of the detected object and the own vehicle 12. Get speed. Furthermore, the radar device has a built-in processing device that processes the detection results of surrounding objects. The processing device excludes noise and roadside objects such as guardrails from monitoring targets based on changes in the relative position and relative speed of individual objects included in the most recent detection results, and detects pedestrians and other objects. The vehicle 12 and the like are tracked and monitored as objects to be monitored. The radar device then outputs information such as the relative position and relative speed of each object to be monitored.

In this embodiment, the photographing unit 24 is mounted in the vehicle cabin, photographs the driver, and generates image data representing a photographed image of a moving image. The photographing unit 24 may employ an infrared sensor that detects characteristic parts of the driver, such as eyes and face, using infrared rays. Note that the photographing unit 24 may further photograph at least one of the vehicle periphery in front, side, and rear of the vehicle 12.

The communication unit 26 establishes communication with the server 14 via the communication network 16 and sends and receives various information such as image information obtained by photographing by the photographing unit 24 and vehicle information detected by the vehicle information detection unit 22.

The display unit 28 provides various information to the occupants by displaying information. In this embodiment, the results of the driving diagnosis are notified by displaying the results of the driving diagnosis. Note that the display unit 28 may output the driving diagnosis result by audio output.

Figure 2:
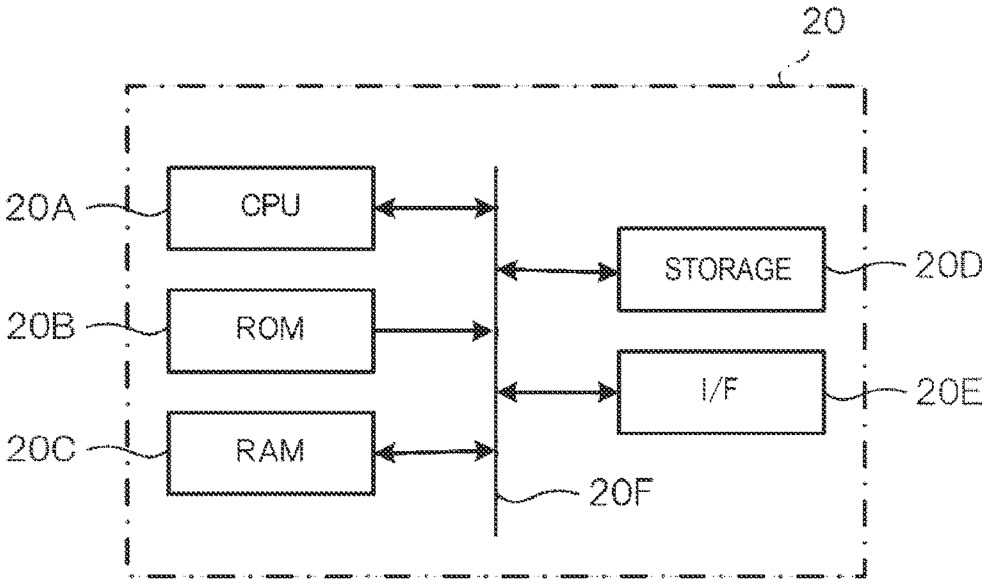
FIG. 2 is a block diagram showing the schematic configuration of the control section.

As shown in FIG. 2, the control unit 20 includes a Central Processing Unit (CPU) 20A, a Read Only Memory (ROM) 20B, a Random Access Memory (RAM) 20C, a storage 20D, an interface (I/F) 20E, and a bus 20F. It is composed of general microcomputers including the following. Furthermore, by executing the program stored in the ROM 20B, the control unit 20 perform driving diagnosis based on image information representing the image photographed by the photographing unit 24 and vehicle information detected by the vehicle information detection unit 22 at the time of photographing the image.

Figure 3:
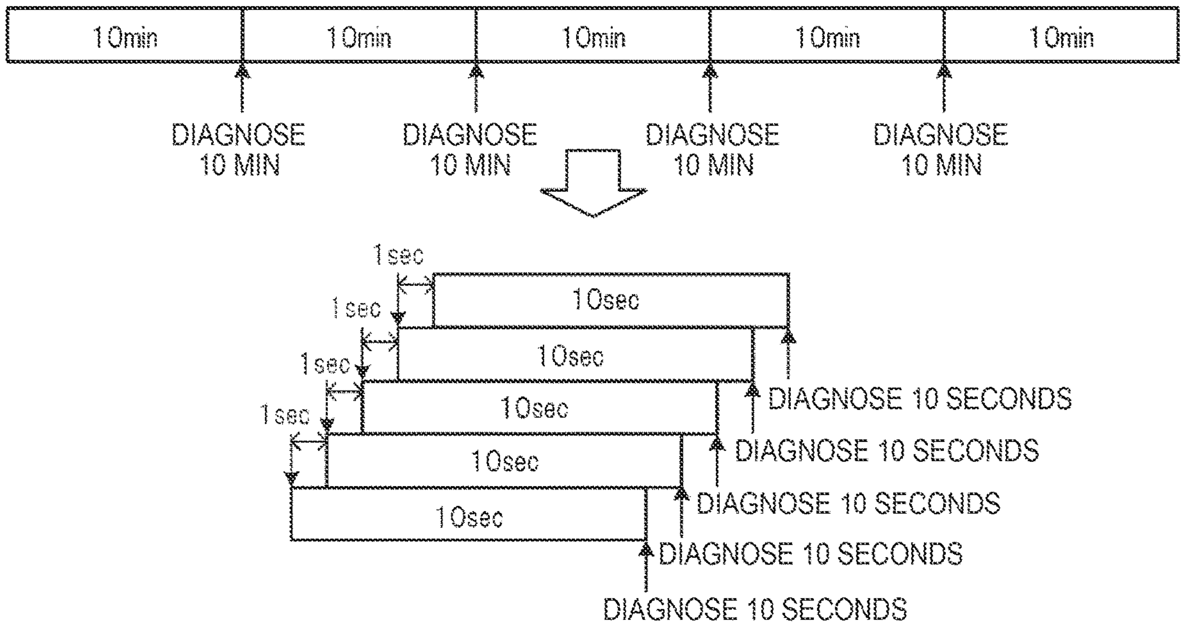
FIG. 3 is a diagram for explaining the conventional driving diagnosis and the driving diagnosis of this embodiment.

By the way, in the conventional driving diagnosis, as shown in the upper part of FIG. 3, the driving diagnosis is performed every predetermined fixed period, such as 10 [min], and a report is created. Therefore, it is not possible to give feedback to the driver at the moment of actually stepping on the brake suddenly, so even if the feedback is given to the driver, the driver may not remember or may not understand what went wrong.

Therefore, the driving diagnosis device 10 according to the present embodiment performs driving diagnosis in real time and provides feedback to the driver.

In order to perform diagnosis in real time, as shown in the lower part of FIG. 3, data is shifted by a predetermined time interval such as 1 [sec], and driving diagnosis is performed while overlapping data for a predetermined time period such as the past 10 [sec]. That is, the control unit 20 transmits image information and vehicle information for a predetermined diagnosis time (e.g., 10 [sec], etc.) that is longer than the first time every predetermined first time (e.g., 1 [sec], etc.). Extracts temporary stop scenes from the information and performs driving diagnosis for safety confirmation. In addition, since the same diagnosis may be performed by performing multiple diagnoses, the first diagnosis result is given priority and output for duplicate diagnostic results.

In this embodiment, a driving diagnosis for safety confirmation in a temporary stop scene is performed, and details of the driving diagnosis for safety confirmation will be explained using a specific example.

Extraction of driving scenes is performed by extracting driving scenes from when the vehicle information satisfies a predetermined start condition to when the vehicle information satisfies a predetermined end condition within the diagnosis time. For example, the start condition for the driving scene is 0.5 [sec] before the vehicle speed>0 [km/h] and the accelerator operation amount>0 [%], and the driving scene ends 4 [sec] after the start. A driving scene with a temporary stop is extracted as a condition.

Examples of conditions when the driving scene is not extracted include when one of the maximum accelerator operation amount<15 [%], when the maximum speed<10 [km/h], when the minimum speed>10 [km/h], or when the direction indicator is off.

As an example of Key Performance Indicator (KPI) calculation, the direction of the direction indicator at the start of the scene, the maximum swing angle [deg] in the interval from the start of the scene to a predetermined second time (for example, 5 seconds), Minimum swing angle [deg] of the interval from the start of the scene to a predetermined second time (e.g., 5 seconds), and minimum swing angle [deg] of the interval from the start of the scene to a predetermined second time (e.g., 5 seconds) before. The continuous duration time during which the swing angle is larger than a predetermined angle (e.g., 30 degrees), and the swing angle of the section from the start of the scene to a predetermined second time (e.g., 5 seconds) are predetermined. The continuous duration time of the angle range (for example, greater than −128 degrees and less than −30 degrees) is calculated. Note that an error message is output when the angle range is −128 degrees.

Then, a driving diagnosis is performed using the calculated KPIs and feedback is provided to the driver in real time. For example, based on the maximum swing angle, the minimum swing angle, and the duration of the angle above the threshold value, each score (1. to 4.) is determined as shown below, and based on the determined score, driving diagnosis is performed and feedback is provided to the driver.

1. When the maximum swing angle<40 [deg], the score is 1 point, otherwise 100 points
2. When the minimum swing angle>−40 [deg], the score is 1 point, otherwise 100 points
3. When the swing angle>30 [deg] and the continuous duration<0.6 [sec], the score is 1 point. Otherwise, the score is 100 points.
4. When the continuous duration of the swing angle<−30 [deg]<0.6 [sec], the score is 1 point, otherwise 100 points.

For example, if the direction indicator at the start of the scene is pointing to the right, the score is 1. When it is 1 point, a message saying "Confirmation in the left direction is insufficient" is displayed on the display unit 28.

Score 2 for anything other than the above. When it is 1 point, a message saying "Confirmation in the right direction is insufficient" is displayed on the display unit 28.

Score 3 for anything other than the above. When is 1 point, a message saying "Check the left side carefully" is displayed on the display unit 28.

Score 4 for anything other than the above. When it is 1 point, a message saying "Check the right side carefully" is displayed on the display unit 28.

When all points other than the above are 100 points, a message saying "This is a very safe start" is displayed.

Also, if the direction indicator at the start of the scene is in the left direction, the score is 2. When is 1, a message saying "Confirmation in the right direction is insufficient" is displayed on the display unit 28.

Score 1 for anything other than the above. When it is 1 point, a message saying "Confirmation in the left direction is insufficient" is displayed on the display unit 28.

Score 4 for anything other than the above. When it is 1 point, a message saying "Check the right side carefully" is displayed on the display unit 28.

Score 3 for anything other than the above. When is 1 point, a message saying "Check the left side carefully" is displayed on the display unit 28.

When all points other than the above are 100, a message saying "This is a very safe departure" is displayed on the display unit 28.

Figure 4:
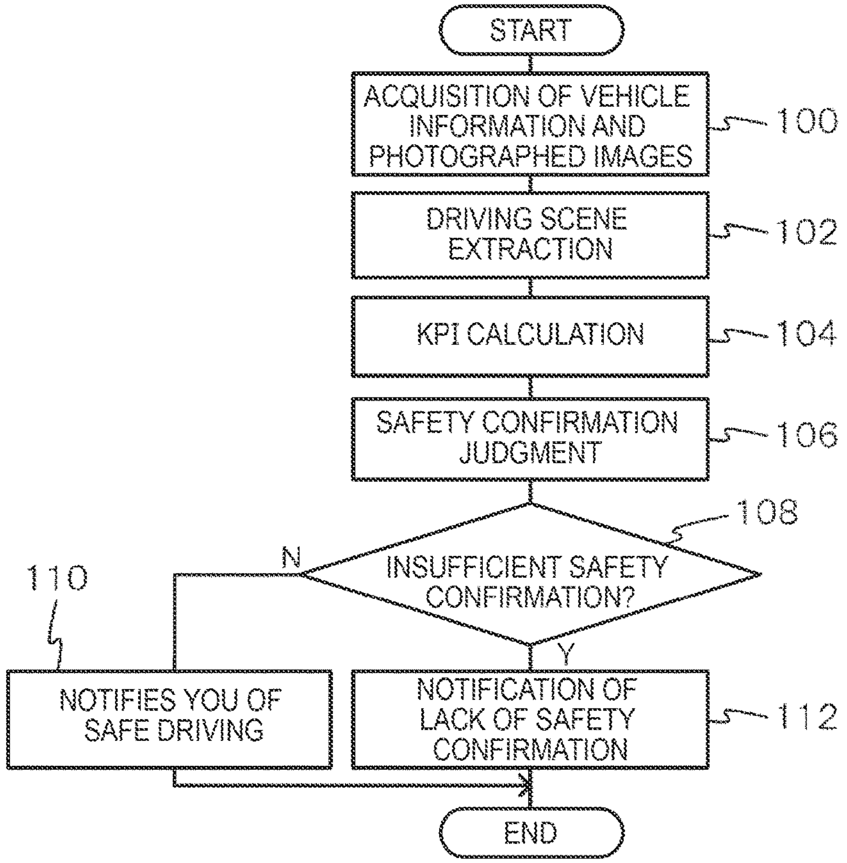
FIG. 4 is a flowchart illustrating an example of the flow of processing performed by the control unit of the driving diagnosis device according to the present embodiment.

Next, specific processing performed by the driving diagnosis device 10 according to the present embodiment configured as described above will be described. FIG. 4 is a flowchart showing an example of the flow of processing performed by the control unit 20 of the driving diagnosis device 10 according to the present embodiment. Note that the process in FIG. 4 is started, for example, every 1 [sec].

In step 100, the CPU 20A acquires vehicle information and a photographed image, and proceeds to step 102. In this embodiment, 10 [sec] worth of vehicle information and photographed images are acquired from the detection results of the vehicle information detection unit 22 and the photographed images photographed by the photographing unit 24. Note that step 100 corresponds to an example of an acquisition unit, and the processing from step 102 to step 106 after step 102 is an example of a diagnosis unit.

In step 102, the CPU 20A extracts a driving scene and proceeds to step 104. That is, a driving scene is extracted from the acquisition results of vehicle information and photographed images according to the conditions described above. For example, the start condition for the driving scene is 0.5 [sec] before the vehicle speed>0 [km/h] and the accelerator operation amount>0 [%], and the driving scene ends 4 [sec] after the start. A driving scene with a temporary stop is extracted as a condition.

In step 104, the CPU 20A calculates the KPI for the extracted driving scene, and proceeds to step 106. In other words, as important performance evaluation indices, the following is obtained: the direction of the turn signal at the start of the scene; the maximum swing angle [deg] in the section from the start of the scene to a predetermined time (for example, 5 seconds); the minimum swing angle [deg] in the section from the start of the scene to a predetermined time (for example, 5 seconds); a continuous duration in which the swing angle of the section from the start of the scene to a predetermined time (e.g., 5 seconds) is larger than a predetermined angle (e.g., 30 degrees); and a continuous duration of the swing angle in a predetermined angle range (for example, greater than-128 degrees and less than-30 degrees) in the section from the start of the scene to a predetermined time (for example, 5 seconds) before.

In step 106, the CPU 20A performs a safety check determination and proceeds to step 108. That is, safety confirmation is determined based on the KPI calculation results. For example, as described above, each score (1. to 4.) is determined based on the maximum swing angle, the minimum swing angle, and the duration of the angle above the threshold value, and the driving diagnosis is performed based on the determined score.

In step 108, the CPU 20A determines whether safety confirmation is insufficient. If the determination is negative, the process moves to step 110, and if the determination is affirmative, the process moves to step 112.

In step 110, the CPU 20A notifies the driver of safe driving and ends the series of processing. For example, a message indicating safe driving is displayed on the display unit 28.

On the other hand, in step 112, the CPU 20A notifies the user of insufficient safety confirmation and ends the series of processing. For example, a message indicating that safety confirmation is insufficient is displayed on the display unit 28.

As described above, in the driving diagnosis device 10 according to the present embodiment, the control unit 20 extracts a temporary stop scene from the image information and vehicle information of a predetermined diagnosis period longer than the first time (for example, 10 seconds, etc.) every predetermined first time (for example, 1 second, etc.), and performs a driving diagnosis for safety confirmation, so that driving diagnosis can be performed in a short time. This makes it possible to perform driving diagnosis in real time and provide feedback to the driver.

In addition, although the above-mentioned embodiment explained the example which performs driving diagnosis with the driving diagnosis device 10 mounted on the vehicle 12, it is not limited to this. For example, an information processing terminal such as a smartphone and an on-vehicle device may be able to communicate with each other, and the information processing terminal may be equipped with the function of the control unit 20. Alternatively, the vehicle information and photographed images may be transmitted to the server 14 to perform driving diagnosis, and the diagnosis results may be transmitted to the control unit 20 and displayed on the display unit 28.

Further, although the processing performed by the control unit 20 in each of the embodiments described above has been described as software processing performed by executing a program, the processing is not limited to this. For example, the processing may be performed using hardware such as a Graphics Processing Unit (GPU), an Application Specific Integrated Circuit (ASIC), and a Field-Programmable Gate Array (FPGA). Alternatively, processing may be performed by combining both software and hardware. Furthermore, in the case of software processing, the program may be stored in various storage media and distributed.

Furthermore, the present disclosure is not limited to the above, and it goes without saying that various modifications can be made in addition to the above without departing from the spirit thereof.

What is claimed is:

1. A driving diagnosis device comprising:
- a camera configured to capture images of a driver of a vehicle;
- a processor; and
  - a memory storing executable instructions that cause the processor to
    - acquire vehicle information detected by one or more sensors provided on the vehicle and the images of the driver captured by the camera, wherein
      - the vehicle information and the images of the driver are acquired over a plurality of diagnosis periods, and
      - a diagnosis period of the plurality of diagnosis periods overlaps with a next sequential diagnosis period, the next sequential diagnosis period being shifted from the diagnosis period by a first interval that is shorter than the diagnosis period;
    - extract a temporary stop scene from the vehicle information and the images of the driver captured in the diagnosis period;
    - perform driving diagnosis on a safety check based on the extracted temporary stop scene; and
    - display a message notifying the driver of the results of the driving diagnosis on the safety check.

2. The driving diagnosis device according to claim 1, wherein the executable instructions further cause the processor to
- perform the driving diagnosis within the diagnosis period from a time when the vehicle information satisfies a start condition to a time when the vehicle information satisfies an end condition.

3. The driving diagnosis device according to claim 1, wherein the executable instructions further cause the processor to
- calculate a predetermined important performance evaluation index for performing the driving diagnosis on the safety check on the temporary stop scene from acquired vehicle information and images of the driver over the diagnosis period; and
- perform the driving diagnosis by using the calculated important performance evaluation index.

4. The driving diagnosis device according to claim 3, wherein the executable instructions further cause the processor to
- calculate, as the important performance evaluation index, a direction of a direction indication signal at a start of the safety check, a head turning angle of the driver in a section from the start of the safety check to a time before an elapse of a second interval, a duration during which the head turning angle in the section from the start of the safety check to the time before the elapse of the second interval is larger than a predetermined angle, and a duration during which the head turning angle in the section from the start of the safety check to the time before the elapse of the second interval is within a predetermined angle range.

5. The driving diagnosis device according to claim 1, wherein the executable instructions further cause the processor to
- display the message notifying the driver about the results of the driving diagnosis obtained first with priority in a case where the results of the driving diagnosis overlap each other.

6. The driving diagnosis device according to claim 4, wherein
- in a case where any one of
  - the direction of the direction indication signal at the start of the safety check is incorrect,
  - the head turning angle of the driver in the section from the start of the safety check to the time before the elapse of the second interval is below a threshold angle,
  - the duration during which the head turning angle in the section from the start of the safety check to the time before the elapse of the second interval is larger than the threshold angle is below a threshold duration, or
  - the duration during which the head turning angle in the section from the start of the safety check to the time before the elapse of the second interval is within a predetermined angle range is below the threshold duration
- the executable instructions further cause the processor to display a message notifying the driver that the driver is not driving safely; and in a case where all of the direction of the direction indication signal at the start of the safety check is correct, the head turning angle of the driver in the section from the start of the safety check to the time before the elapse of the second interval is above a threshold angle, the duration during which the head turning angle in the section from the start of the safety check to the time before the elapse of the second interval is larger than the threshold angle is above a threshold duration, and the duration during which the head turning angle in the section from the start of the safety check to the time before the elapse of the second interval is within a predetermined angle range is above the threshold duration the executable instructions further cause the processor to display a message notifying the driver that the driver is driving safely.

* * * * *